(12) United States Patent
Smith et al.

(10) Patent No.: US 6,654,368 B1
(45) Date of Patent: Nov. 25, 2003

(54) APPARATUS AND METHOD FOR PROCESSING FRAME STRUCTURED DATA SIGNALS

(75) Inventors: William Smith, County Down (GB); Christopher Clotworthy, Belfast (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/537,362

(22) Filed: Mar. 29, 2000

(51) Int. Cl.[7] .......................... H04L 12/50; H04Q 11/00
(52) U.S. Cl. ...................... 370/376; 370/428; 370/442; 370/510; 709/236; 710/104
(58) Field of Search ................... 370/375, 376, 370/377, 378, 379, 389, 428, 429, 351, 395.1, 397, 464, 498, 321, 337, 347, 349, 350, 393, 394, 442, 503, 510, 512; 709/236; 710/104, 105

(56) References Cited

U.S. PATENT DOCUMENTS 5,450,401 A * 9/1995 Tatsuki et al. ............... 370/379

6,400,734 B1 * 6/2002 Weigand ..................... 370/514
6,445,719 B1 * 9/2002 Schneider et al. .......... 370/506

* cited by examiner

*Primary Examiner*—Dang Ton
*Assistant Examiner*—Inder Pal Mehra
(74) *Attorney, Agent, or Firm*—Barnes & Thornburg

(57) ABSTRACT

An apparatus for processing a frame structured data signal, the data signal comprising at least one data frame comprising a plurality of data elements arranged in accordance with a frame structure. The apparatus is arranged to generate a tag element for each data element, the configuration of the tag element corresponding to the position of the respective data element within the detected data frame. The apparatus further includes a data processor, arranged to perform one or more respective processing operations on one or more of the data elements, wherein the or each processing operation is determined by the configuration of the respective tag element. The apparatus enjoys the flexibility afforded by a data processor while having relatively low processing power requirements. As a result, it is capable of processing a relatively high volume of data in real time, and is programmable to support more than one frame structure and data rate thereby reducing development, implementation, field maintenance and upgrade costs.

11 Claims, 3 Drawing Sheets

APPARATUS AND METHOD FOR PROCESSING FRAME STRUCTURED DATA SIGNALS

FIELD OF THE INVENTION

The present invention relates to a method and apparatus for processing frame structured data signals.

BACKGROUND TO THE INVENTION

Many data transmission systems, particularly telecommunications systems, use frame structured data signals to communicate from node to node within the system. A frame structured data signal comprises one or more data frames, each comprising a plurality of data elements arranged in accordance with a frame structure or protocol. Transmission standards as recommended by, for example, the International Telecommunications Union Telecommunications Standardization Sector (ITU-T), describe protocols based on a framed data structure, such as G.703, E1, E2 and E3, and are used by, for example, Synchronous Digital Hierarchy (SDH) and SONET transmission systems. Bellcore DS1, DS2 and DS3 services also use frame structured data signals.

Data elements within a data frame may have different significances or functions. For example, one or more of the data elements may relate to data traffic or payload, while others may relate to overhead information concerning, for example, error checking or control. For a given frame structure, the significance of each data element is determined by its position within the data frame.

When a frame structured data signal is received by a network node, such as a PSTN (Public Standard Telephone Network) exchange, a router or a multiplexer, the node may be required to perform one or more processing operations on the data signal. The network node must determine the significance of each received data element in order to process it appropriately.

Conventionally, a network node includes a processing apparatus having hardware logic or circuitry for interpreting the frame structure. The circuitry includes modules for processing each type of data element and, as a data frame is received, each successive data element is sent to the appropriate processing module. A problem with this arrangement is inflexibility. The circuitry is dedicated to processing a particular frame structure and in a particular manner. The cost of re-designing the circuitry for a different application, or to upgrade, and manufacturing new hardware, typically in the form of an ASIC, is prohibitive. Also, hardware circuitry must be subjected to relatively lengthy testing before being released commercially. Typically, the testing of a conventional hardware implementation as outlined above can account for 60% of the time-to-market of the resulting commercial product.

An alternative is to use a programmable data processor, such as a DSP or RISC processor, to interpret and process a frame structured data signal in software. While this introduces a relatively high level of flexibility, the data processor must keep track of the position of each data element within each data frame. The processing power required to do this is relatively high. For a given VLSI device area or gate count, the speed at which a data processor can process a frame structured data signal is significantly less than a corresponding hardware implementation. In many applications, therefore, a data processor which interprets frame structure in software is unsuitable, that is, too inefficient, for processing a frame structured data signal in real time.

SUMMARY OF THE INVENTION

Accordingly, a first aspect of the invention provides an apparatus for processing a frame structured data signal, the data signal comprising at least one data frame comprising a plurality of data elements arranged in accordance with a frame structure, the apparatus comprising: a data frame detector module, arranged to receive the data signal and to generate a frame detect signal upon detection of a data frame;

a tag generating module, responsive to said frame detect signal and to said data signal, and arranged to generate a tag element for each data element, the configuration of the tag element corresponding to the position of the respective data element within the detected data frame; and a data element processor, arranged to perform one or more respective processing operations relating to one or more of said data elements, wherein the or each processing operation to be performed for a data element is determined by the configuration of the respective tag element.

Associating a tag element with each data element removes the need for the data processor to keep track of the position of each data element in its respective data frame—the data processor does not need to calculate the position, and therefore significance, of each data element within its respective frame since this information is identified by the configuration of the respective tag element. This significantly increases the speed at which the data processor can process a frame structured data signal. The apparatus of the invention thus enjoys the flexibility afforded by a data processor while having relatively low processing power requirements. As a result, the apparatus is capable of processing a relatively high volume of data in real time, and is programmable to support more than one frame structure and data rate thereby reducing development, implementation, field maintenance and upgrade costs.

Preferably, the tag generating module includes a data element counter, responsive to the frame detect signal and to the data signal, and arranged to count the number of data elements detected after the detection of a data frame; and an encoder module, co-operable with the data element counter to generate a tag element for each data element, the configuration of the tag element depending on the number of data elements counted since the detection of said data frame.

Preferably, the apparatus further includes a data buffer and is arranged such that each data element is stored in the data buffer in association with a respective tag element.

Advantageously, the data processor is co-operable with a program memory, the program memory being programmable with a plurality of processing modules, each processing module defining one or more processing operation, wherein the configuration of one or more tag element identifies a respective location in said program memory corresponding with one or more processing modules to be executed, by said data processor, in relation to a respective data element. Preferably, one or more data elements are processed within an interrupt service routine, each respective tag element corresponding with a respective tag handler for identifying a respective processing module.

Advantageously, the apparatus further comprises a data element aligner, responsive to the frame detect signal and to the data signal, and arranged to provide each data element in parallel, the data element aligner being co-operable with the tag generating module so that each parallely provided data element is generated in synchronism with a respective tag element.

A second aspect of the invention provides a method of processing a frame structured data signal, the data signal comprising at least one data frame comprising a plurality of data elements arranged in accordance with a frame structure, the method comprising: receiving the data signal; generating a frame detect signal upon detection of a data frame; generating a tag element for each data element, the configuration of the tag element corresponding to the position of the respective data element within the detected data frame; and performing one or more respective processing operations relating to one or more of said data elements, wherein the or each processing operation to be performed for a data element is determined by the configuration of the respective tag element.

Preferably, the method further includes counting the number of data elements detected after the detection of a data frame; and generating a tag element for each data element, the configuration of the tag element depending on the number of data elements counted since the detection of said data frame.

Advantageously, the method further includes storing each data element in a data buffer in association with a respective tag element.

Preferably, the method further includes programming a program memory with a plurality of processing modules, each processing module defining one or more processing operation; and executing one or more processing module in relation to a respective data element, wherein the configuration of one or more tag element identifies a respective location in said program memory corresponding with one or more processing modules to be executed in relation to said respective data element.

Preferably, the method further includes aligning the data signal to provide each data element in parallel; and synchronizing the generation of each tag element with a respective parallel data element.

Other aspects of the invention will become apparent to those ordinary skilled in the art upon review of the following description of specific embodiments of the invention and with reference to the accompanying drawings.

BRIEF DESCRIPTION OF THE DRAWINGS

Embodiments of the invention are now described by way of example and with reference to the accompanying drawings, in which.

DETAILED DESCRIPTION OF THE DRAWINGS

Figure 1:
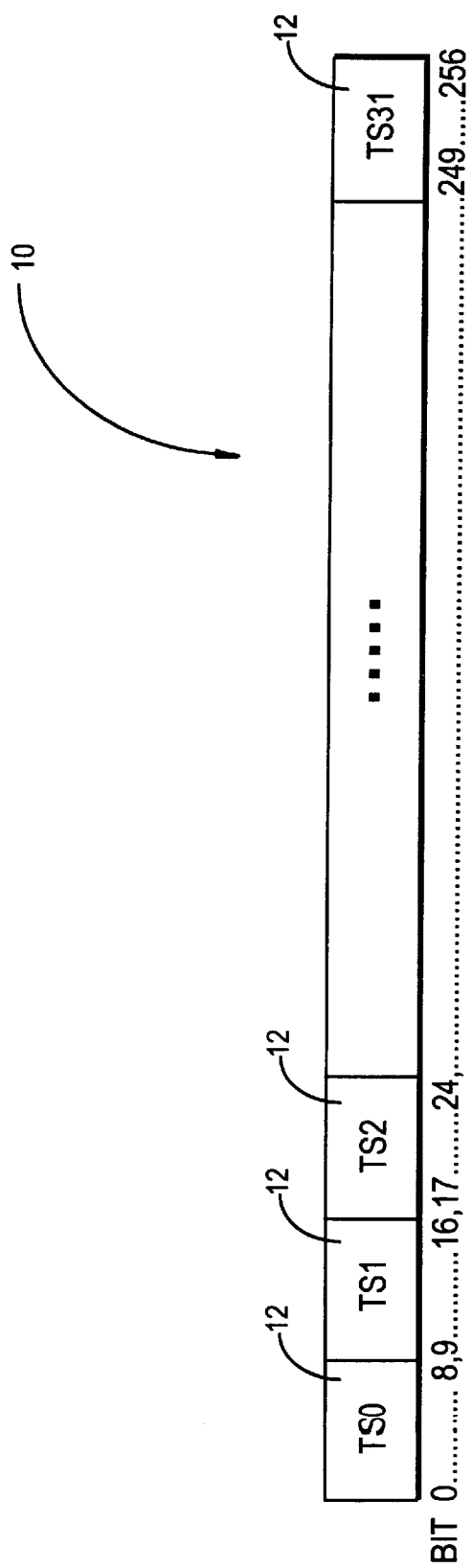
FIG. 1 is a schematic view of a data frame structure according to a ITU-T G.703 2.048 Mbit/s standard.

Referring now to FIG. 1 of the drawings, there is shown, generally indicated at 10, a schematic representation of a data frame comprising a plurality of data elements 12 arranged in accordance with a frame structure. The frame structure represented in FIG. 1 is the ITU-T G.703 E1 FAS-framed 2.048 Mbit/s standard in which the data frame 10 comprises 256 bits equally divided into 32 time slots or channels, each 8 bits wide, for carrying data at a rate of 64 Kbit/s. A data signal (not shown) based on this standard comprises repeated data frames of 256 bits. Each 8-bit time slot corresponds with a data element 12, or protocol element, of the data frame 10 and, in the present example, is capable of carrying a 64 Kbit/s data channel. In general, a data element may comprises any number of bits or bytes as dictated by the relevant frame structure or protocol.

In the data frame 10 shown in FIG. 1, the first data element, comprising the first eight data bits and being designated TS0, contains a fixed framing sequence of bits. The framing bit sequence can be used to identify or detect the beginning, or arrival, of the G.703 frame using a conventional frame alignment algorithm as defined by the ITU-T G.706 standard (not illustrated). In accordance with this particular G.703 standard, TS0 contains overhead data bits, rather than a framing bit sequence, in alternate data frames 10. The remaining data elements are designated TS1 through TS31 (only TS1, TS2 and TS31 shown in FIG. 1) and each comprise eight data bits. The information carried in these data elements 12 normally represents the payload, or traffic data, of the data frame 10. Thus, it will be appreciated that the position of a data element 12 within a data frame 10 determines the significance of that data element 12.

The G.703 frame structure is a relatively simple one and, for reasons of clarity, the present invention is described hereinafter in the context of an apparatus for processing a frame structure of the type depicted in FIG. 1. It will be apparent, however, that the method and apparatus of the invention can readily be employed in the processing of a data signal arranged according to any frame structure including, but not limited to, conventional SDH, SONET and asynchronous standards as laid down by ITU-T, ANSII Bellcore and the European Telecommunications Standards Institute (ETSI).

Figure 2:
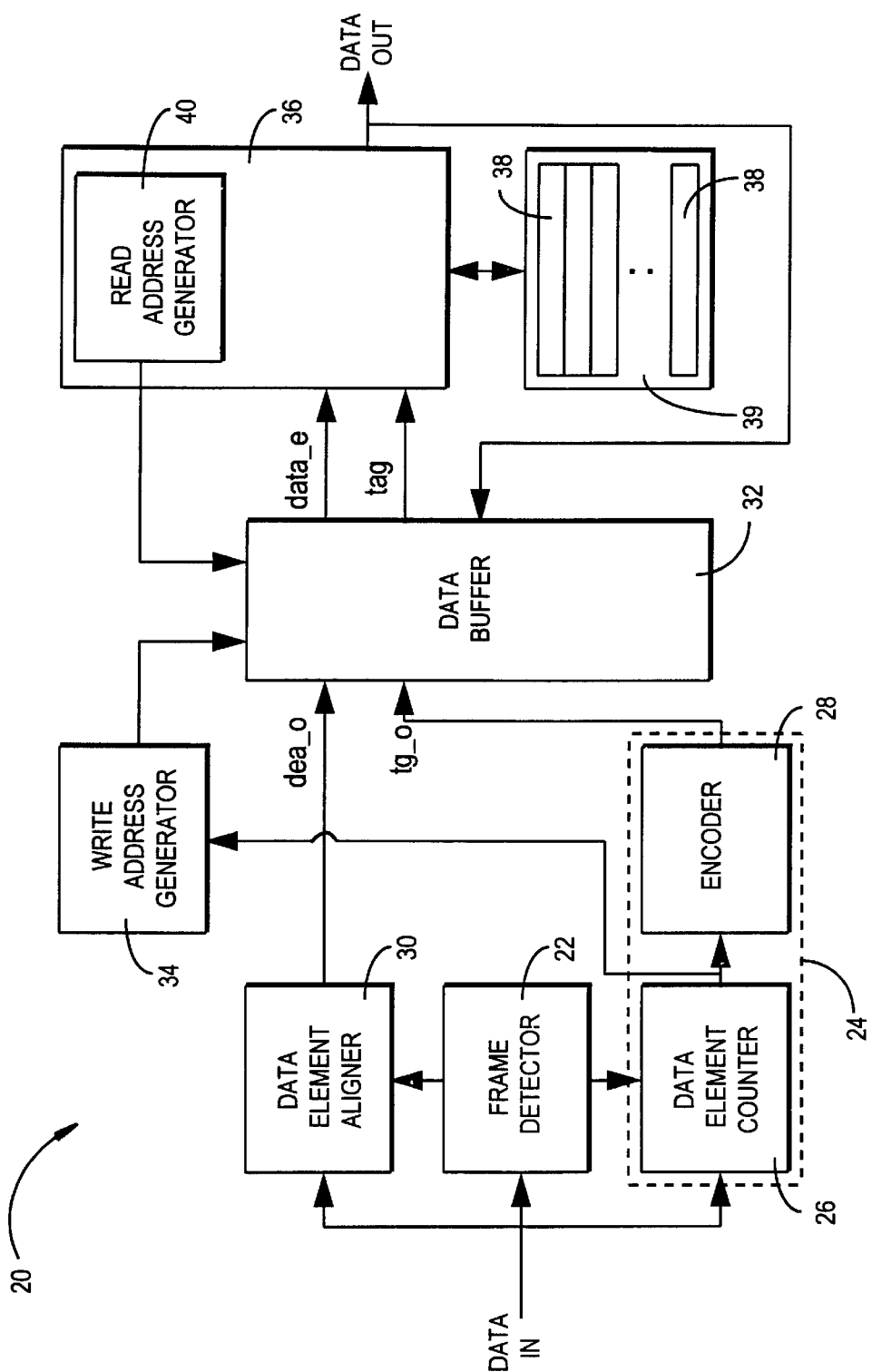
FIG. 2 is a schematic view of an apparatus according to the invention.

With reference now to FIG. 2, there is shown, generally indicated at 20, an apparatus according to the invention. The apparatus 20 includes a data frame detector module, or frame alignment module, hereinafter referred to as frame detector 22, arranged to receive a frame structured data signal (indicated as DATA IN) via a conventional input port (not shown). The data signal typically comprises a series of data frames 10 and the frame detector 22 is configured to detect or identify the instance or arrival of each data frame 10. This is achieved in conventional manner using an appropriate conventional frame alignment algorithm such as defined in ITU-T G.706. Each time a data frame 10 is detected, the frame detector 22 generates a signal indicating that a data frame 10 has been detected.

The apparatus 20 further includes a tag generating module, or tag generator 24, which is co-operable with the frame detector 22 to receive the frame detect signal. The tag generator 24 is further responsive to the data signal in order to detect successive instances of data elements 12. The tag generator 24 is thus able to determine the position of each data element 12 within its respective data frame 10. For each data element 12 detected, the tag generator 24 generates a respective tag element 325 (FIG. 3), or code, the configuration or setting of which corresponds to the position of the respective data element 12 within the current detected data frame 10. The tag generator 24 generates a signal tg_o comprising a respective tag element 325 for successive data elements 12, the signal tg_o being arranged in tag element-parallel form.

It will be noted that the tag generator 24 does not need to receive the actual data elements 12. Rather, it is sufficient that the tag generator 12 is responsive to clock signal governing the data elements, or a derivative of the clock signal. In its simplest form, the tag generator 24 comprises a data element counter 26 and an encoder 28, which are described in more detail with reference to FIG. 3.

In a typical synchronous or asynchronous transmission system, the data elements 12 are provided bit-serially. To facilitate processing of the data signal, however, it is preferred that the data signal is rearranged to provide the data bits of each data element 12 in parallel. To this end, the apparatus 20 also includes a data element alignment module, or data element aligner 30, which is arranged to receive the data signal and is co-operable with the frame detector 22 to receive the frame detect signal. The data element aligner 30 rearranges the data signal to provide a signal dea_o which comprises successive data elements 12 in a parallel format.

Since the data element aligner 30 and the tag generator 24 each operate from the same clock signal, namely the clock signal extracted from, or associated with, the data signal, and are each further synchronized by the frame detect signal, their respective output signals dea_o, tg_o are produced in synchronism. Thus, for each data element 12 included in the signal dea_o, a respective tag element 32S is generated simultaneously in the signal tg_o, the configuration or setting of the tag element 32S corresponding to the position of the respective data element 12 within the respective data frame 10.

The apparatus 20 further includes a data memory or data buffer 32 such as, for example, a dual port data RAM. The data buffer 32 is arranged to receive the respective output signals dea_o, tg_o of the data element aligner 30 and the tag generator 24, and to store each data element 12 in association with its respective tag element 32S. Conveniently, each data element 12 and its associated tag element 32S may be stored in adjacent memory locations. For example, where the data elements 12 and tag elements 32S each comprise 8 bits, a data element 12 may be combined with the respective tag element 32S to form a 16-bit word in the data buffer 32.

The apparatus 20 preferably includes a write address generator 34 to facilitate storage of data elements and tag elements in the data buffer 32. It is preferred that the data elements 12, together with their respective tag element 32S (the combination of which is hereinafter referred to as a tagged data element 12), are stored in the data buffer 32 in sequential data frame order. To this end, the write address generator 34 is provided with a buffer start address, at which to store the first tagged data element 12, and an adder (not shown in FIG. 2) which increments the buffer address by an appropriate amount, in the present example 16 bits, each time a data element 12 is detected, to generate the buffer address at which to store the next tagged data element 12. Conveniently, the write address generator 34 is co-operable with the tag generator 24 to determine when to increment the buffer address.

The apparatus 20 includes a data element processor, or data processor 36, for performing one or more processing operations in relation to one or more of the data elements 12, as required by the application. The data processor 36 may take the form of a RISC, CISC, DSP or other conventional processor. The processor 36 is associated with one or more processing module 38 for implementing the or each processing operation. The processing module(s) 38 are conveniently held in a program memory 39, such as a programmable data RAM, for retrieval and execution by the data processor 36 when required. Typically, there are a plurality of processing modules 38, in the form of executable program code, stored in data RAM.

The data processor 36 includes a read address generator 40 which determines the data buffer 32 address from which the next tagged data element 12 to be processed is read. In its simplest form, the read address generator 40 is arranged to read the tagged data elements 12 from the data buffer 32 sequentially in data frame order which, in the preferred embodiment, is also the order in which the data elements are written to the data buffer 32. In FIG. 2, data_e and tag respectively represent the reading of a data element 12 and corresponding tag element 32S by the data processor 36. In the present example, each tagged data element 12 may be read as a 16-bit word from the data buffer 32 into a data register (not shown) in the data processor 36.

When the data processor 36 reads a tagged data element 12 from the data buffer 32, it must determine how the data element 12 is to be processed. This is achieved by using the respective tag element 32S as an indicator of which processing module is to be executed for the data element 12. Conveniently, the tag element 32S serves as an address pointer, or address vector, identifying, or selecting, a location in program memory 39 from which the appropriate processing module 38 can be executed. For example, where the tag element 32S comprises 8 data bits, each configuration or setting of those bits corresponds to a respective location in program memory 39. This allows 256 different locations to be identified and, accordingly, 256 different processing modules to be selectable. It will be apparent that the size of the tag element 12 does not necessarily need to be 8 data bits and can be determined by the requirements of the application.

The selected processing module 38 operates on the respective data element 12, the value or setting of which may be obtained from the data register containing the tagged data element 12 or from the data buffer 32. In the present example, to separate the data element 12 from the tag element 32S a logical AND filtering operation may be performed by the data processor 36 using, for example in the case of a 16-bit tagged data element 12, a hexadecimal FF00 or 00FF filter word, depending on how the data element 12 and the tag element 32S are arranged.

In a preferred embodiment, an interrupt service routine (ISR) is arranged to handle the processing of the tagged data elements 12. Conveniently, the ISR is arranged to cause an interrupt when a predetermined number of tagged data elements 12 are stored in the data buffer 32 waiting to be processed, each of the waiting tagged data elements 12 being processed during the interrupt. The ISR, which is carried by and operable on the data processor 36, is conveniently provided with the write address into the data buffer 32 and can thus determine the next tagged data element 12 to be processed as well as how many tagged data elements 12 are to be processed within the ISR. Each tagged data element 12 is read separately and the tag element 32S, which in the present example has a range of values from 0 to 255, serves as an index to a table of tag handlers (not shown) each tag element value preferably having its own corresponding tag handler. For each tagged data element 12, the corresponding tag handler is called with the associated data element 12 being passed as an input to the corresponding processing routine.

The number of tagged data elements 12 to be processed within an ISR is not critical but, for reasons of efficiency, it is preferred to be more than one.

The operations performed by respective processing modules 38 are the same as are conventionally required in processing frame structured data signals. Some of the processing modules 38 pass the respective data element 12 on to an output buffer or port (not shown), or on to another part of the overall apparatus, for example network node (not shown), of which the apparatus 20 is part. Alternatively, a processing module 38 may move the data element 12 back into the data buffer 32. A processing module 38 may perform a computational operation on the respective data element 12, for example a checksum operation, or, in cases where the data element 12 does not carry useful information, the processing module 38 may be arranged to do nothing with that data element 12.

It will be apparent that the data processor 36 and associated programmable program memory 39 provide a relatively high degree of flexibility to the apparatus 20. The operation of the data processor 36 and the processing modules 38 are programmable by an operator and may readily be replaced or upgraded. The apparatus 20 is thus adaptable to support a variety of different data frame structures and data rates and may readily be reprogrammed, even in the field.

The generation of tag elements 325 and their association with respective data elements 12 is advantageously performed in hardware or logic and this relieves the data processor 36 of the time consuming task of calculating and keeping track of the position of respective data elements 12 within a data frame 10. The level of processing power required by the data processor 36 is therefore relatively low. The apparatus 20 is thus able to operate fast enough to process a relatively high volume of data in real time while still enjoying the flexibility afforded by a data processor.

Figure 3:
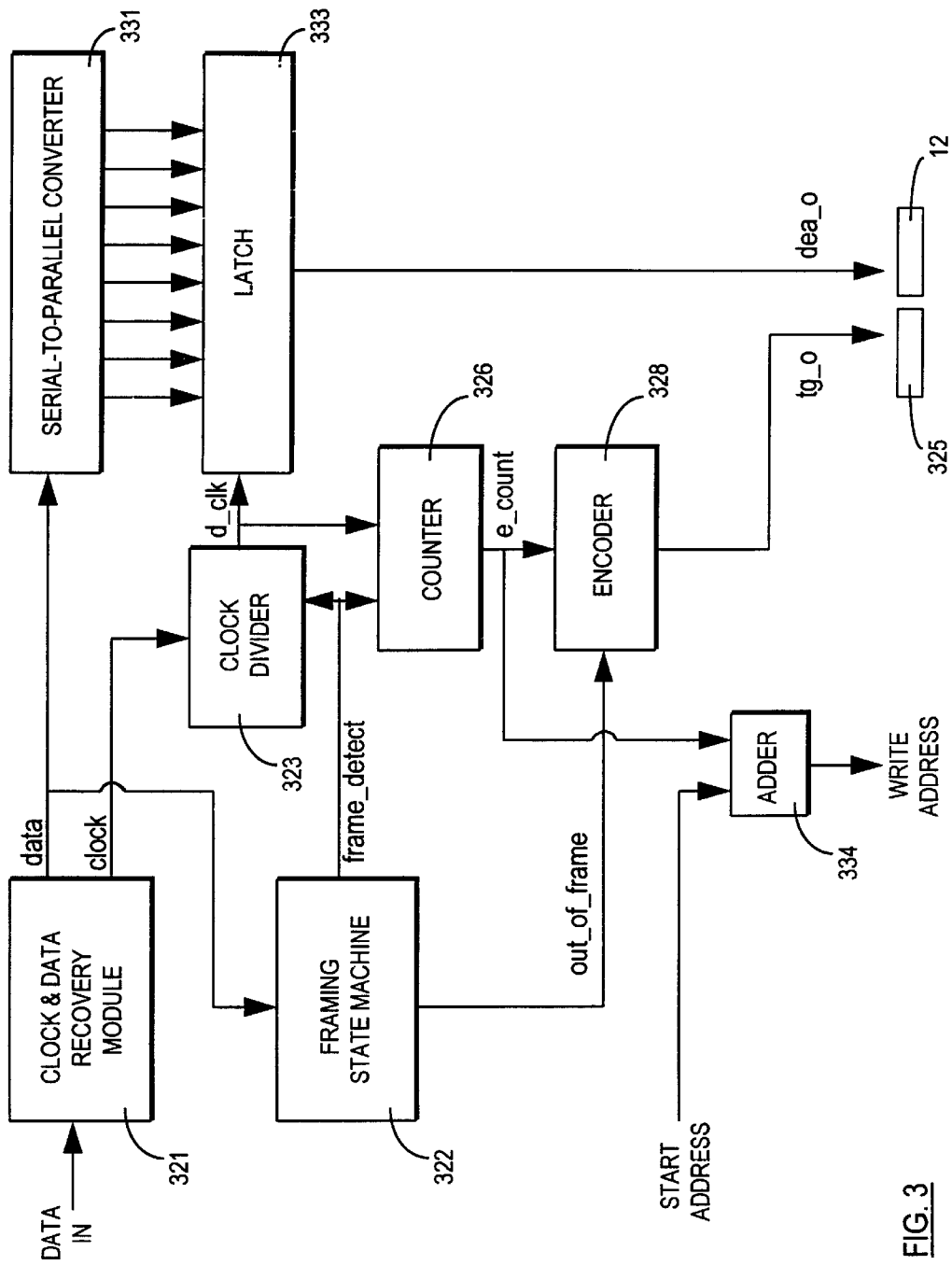
FIG. 3 is a schematic view of a portion of a specific embodiment of the apparatus of FIG. 2.

Referring now to FIG. 3, there is shown, by way of example, a specific embodiment of the frame detector 22, tag generator 24, data element aligner 30 and write address generator 34. The embodiment of FIG. 3 is specifically adapted to process a frame structure of the type described with reference to FIG. 1.

The incoming frame structured data signal, which may be synchronous or asynchronous, is shown as DATA IN. A conventional clock and data recovery module 321 receives the data signal and recovers the data (data) and clock (clock) signals in conventional manner. A frame detector in the form of a framing state machine 322 provides a conventional hardware implementation of the appropriate frame alignment algorithm, in the present case the G.706 algorithm for detecting, or recognising, the framing bit sequence of data element TS0 (FIG. 1). The framing state machine 322 is arranged to receive the recovered data signal and, upon recognition of a valid data frame 10, to generate a frame alignment signal, frame_detect. If, after a pre-determined period of time, the framing state machine 322 is unable to detect a valid data frame 10, it generates an out_of_frame signal.

A clock divider module 323 is arranged to receive the recovered clock signal clock and to produce a derivative clock signal d_clk with a cycle which corresponds with the size of a data element 12. In the present example, each data element 12 comprises eight data bits and so the clock divider 323 comprises a divide-by-eight counter. The signal d_clk thus indicates the detection of successive instances of data elements 12.

A tag generator is provided in the form of a data element counter 326 and an encoder 328. The data element counter is responsive to the d_clk signal to count the number of data elements 12 detected. The frame_detect signal is arranged to reset the element counter 326 upon detection of each successive data frame 10. Thus, the output e_count of the element counter 326 indicates the position of a data element 12 within a detected data frame 10. In the present example, the element counter 326 is a 0-to-31 binary counter since each data frame 10 comprises 32 data elements 12. The signal e_count is therefore 5-bits wide. The encoder 328 is arranged to receive e_count and to generate a tag element 325 corresponding to the 5-bit value of e_count. In its simplest form, the encoder 328 is a conventional 5-to-8 bit encoder, generating a unique 8-bit tag element 325, or code, for each respective value of e_count. Preferably, the encoder 328 is programmable so that, for example, two or more different values of e_count give rise to the same tag element 325, as required by the application.

A write address generator is provided in the form of an adder 334. The adder 334 is provided with a data buffer start address and increments the start address by, in the present example, 16 bits in response to each detected data element 12 to generate the address in the data buffer 32 at which the next tagged data element 12 is to be stored. To this end, the adder 334 is responsive to the e_count signal, although equally the adder 334 may co-operate with the d_clk signal.

In the present example, it is assumed that the data signal DATA IN is received bit serially. The recovered data signal data is therefore also bit serial. A data element aligner is provided in the form of a serial-to-parallel converter 331 and a latch 333. The serial-to-parallel converter 331 is arranged to receive the recovered data signal data and to produce each successive data element 12 in byte-parallel form. Each data element 12 is then stored in latch 333 to allow the production of each byte-parallel data element 12 to be synchronized with the generation of a respective tag element 325. Conveniently, this is achieved by controlling the operation of the latch 333 with d_clk. Synchronization is further improved by resetting the clock divider 323 when frame_detect indicates that a new data frame 10 is detected.

Thus, the signals tg_o and dea_o respectively, and in parallel, present an 8-bit tag element 325 and an 8-bit data element 12, wherein the configuration or setting of the tag element 325 indicates the position of the data element 12, and therefore its significance, within its respective data frame 10.

A skilled person will appreciate that the apparatus and method of the invention can readily be applied to other data frame structures or protocols, although adaptation of the specific apparatus 20 configuration may be required to suit the particular frame structure or protocol in question. Notably, the size or width of each data element within a frame structure is not necessarily the same. For example, an Ethernet data frame structure or protocol includes a fixed length header and a variable payload area, while the North American T1 standard requires the identification of single bits over a number of consecutive data frames for data frame alignment. In this case, the size or the width of each data element 12 produced in signal dea_o is not constant. For example, where the data element 12 is a framing bit, it will only be one data bit wide, while the traffic data elements 12 may be 8 bits wide. For such a framing structure, an adaptive serial-to-parallel converter, clock divider and latch arrangement (not shown) is required. The clock divider may, for example, be programmable according to the frame structure to activate the latch and the counter in a cycle of non-even intervals (depending on the respective size of successive data elements 12 within the frame structure in question), each cycle being initiated by the frame-detect signal as before. An SDH STM-N frame structure includes data elements representing higher order pointers, section overhead, lower order pointers and path overhead as well as the actual payload or traffic data. In each case, the apparatus and method of the invention can readily be arranged to process the particular frame structure or protocol. To process, for example, an STM-1 protocol, containing 2.048Mbit/s E1 PDH data in VC12 containers, it is convenient to generate tag elements in stages. The apparatus 20 may comprise a first stage for processing higher order pointers and generating tag elements for the section overhead and path overhead data elements, a second stage for processing the lower order pointers and generating tag elements for VC12 data and path overhead, and a third stage for de-mapping C12 data from VC12 data and generating tag elements for the C12 data.

In some cases, an apparatus 20 of the invention is adaptable, through for example programming of the data processor 36 and associated program memory 39 and/or programming of the encoder 28, 328, to support processing of different frame structures or protocols without requiring modification to the apparatus 20 hardware. This provides substantial cost and time saving benefits. Moreover, the programmable nature of the apparatus 20 enables it to be adapted to support different versions of the same frame structure protocol, for example upgrades or different data rates.

The number and nature of the tag elements generated by the apparatus 20 depends on the specific frame structure or protocol to be processed. For example, for the frame structure of FIG. 1, if it is desired to process the respective data element 12 of each time slot representing a 64 Kbit/s traffic channel, then the encoder 28, 328 is arranged to generate 32 different tag elements, or codes, one for each of the 32 data elements contained within the data frame 10. The data processor 36 is thus able to differentiate between each and every data element 12 and to process it appropriately. In a simpler application, the data processor 36 may only need to differentiate between payload, or traffic, data elements 12 and the framing sequence element (TS0). In this case, the encoder 28, 328 need only generate two different tag elements, one for association with the framing sequence element (TS0), the other for association with each traffic data element (TS1–TS31).

In a more complex application, supporting, for example, pri-ISDN and using the data element 12 in time slot 16 (TS16) as a D-channel, there may be three different tag elements, one for the framing sequence element (TS0), one for all of the traffic data elements (TS1–TS15, TS17–TS31), and one for the D-channel (TS16).

In each case, there is normally an additional tag element or code representing an invalid data element, or an out-of-frame event. In the embodiment illustrated in FIG. 3, the additional out-of-frame tag element is generated by the encoder 328 in response to an assertion by the out_of_frame signal that the framing state machine 322 has not detected a valid data frame 10. In this case, each data element 12 produced following the assertion of out_of_frame is associated with a respective out-of-frame tag element until the next valid data frame is detected. Where an out-of-frame event is detected, an appropriate error handler may be called generating, for example, an alarm signal.

It will be apparent that the number of bits or bytes required to implement the tag element depends on the number of different configurations of tag element required by an application. In practice, each tag element is conveniently a bit, half-byte, byte, word, or other unit on which a data processor and a data memory normally operate. In addition, there may be more than one tag element associated with each data element. For example, in the case where the data frame comprises a plurality of different traffic channels, each traffic channel comprising a data element, a respective first tag element may be associated with each data element to denote that the data element is a traffic element, and a respective second tag element to identify to which traffic channel the data element corresponds. The first and second tag elements may be generated separately by the tag generator 24. Alternatively, the second tag element may be generated as one or more additional bits appended to the tag element 325.

Examples of processing operations which may be performed by the processing modules 38 include simple traffic channel processing where the respective data element 12 corresponding to each valid time slot is moved to an output buffer or port (not shown) while the data elements corresponding to non-traffic carrying time slots may be ignored by the data processor 36.

Alternatively, the processing modules 38 may effect data traffic channel cross-connection, where a traffic data element 12 of one time slot in a current data frame 10 is moved by a processing module 38 to a different time slot in a subsequent data frame. Alternatively still, a processing module 38 my be arranged to perform an error checking routine on a given data element 12.

The apparatus of the invention, including the data processor 36, are conveniently implemented in an Application Specific Integrated Circuit (ASIC). The data processor preferably takes the form of a RISC core provided within the ASIC.

The invention is not limited to the embodiments described herein which may be modified or varied without departing from the scope of the invention.

What is claimed is:

1. An apparatus for processing a frame structured data signal, the data signal comprising at least one data frame comprising a plurality of data elements arranged in accordance with a frame structure, the apparatus comprising:

a data frame detector module, arranged to receive the data signal and to generate a frame detect signal upon detection of a data frame;

a tag generating module, responsive to said frame detect signal and to said data signal, and arranged to generate a tag element for each data element, the configuration of the tag element corresponding to the position of the respective data element within the detected data frame; and a data element processor, arranged to perform one or more respective processing operations relating to one or more of said data elements, wherein the or each processing operation to be performed for a data element is determined by the configuration of the respective tag element.

2. An apparatus as claimed in claim 1, wherein the tag generating module includes a data element counter, responsive to the frame detect signal and to the data signal, and arranged to count the number of data elements detected after the detection of a data frame; and an encoder module, co-operable with the data element counter to generate a tag element for each data element, the configuration of the tag element depending on the number of data elements counted since the detection of said data frame.

3. An apparatus as claimed in claim 1, in which the apparatus further includes a data buffer and is arranged such that each data element. is stored in the data buffer in association with a respective tag element.

4. An apparatus as claimed in claim 1, in which the data processor is co-operable with a program memory, the program memory being programmable with a plurality of processing modules, each processing module defining one or more processing operation, wherein the configuration of one or more tag element identifies a respective location in said program memory corresponding with one or more processing modules to be executed, by said data processor, in relation to a respective data element.

5. An apparatus as claimed in claim 4, wherein one or more data elements are processed within an interrupt service routine, each respective tag element corresponding with a respective tag handler for identifying a respective processing module.

6. An apparatus as claimed in claim 1, the apparatus further comprising a data element aligner, responsive to the frame detect signal and to the data signal, and arranged to provide each data element in parallel, the data element aligner being co-operable with the tag generating module so that each parallely provided data element is generated in synchronism with a respective tag element.

7. A method of processing a frame structured data signal, the data signal comprising at least one data frame comprising a plurality of data elements arranged in accordance with a frame structure, the method comprising:

receiving the data signal;

generating a frame detect signal upon detection of a data frame;

generating a tag element for each data element, the configuration of the tag element corresponding to the position of the respective data element within the detected data frame; and performing one or more respective processing operations relating to one or more of said data elements, wherein the or each processing operation to be performed for a data element is determined by the configuration of the respective tag element.

8. A method as claimed in claim 7, the method further including counting the number of data elements detected after the detection of a data frame; and generating a tag element for each data element, the configuration of the tag element depending on the number of data elements counted since the detection of said data frame.

9. A method as claimed in claim 7, the method further including storing each data element in a data buffer in association with a respective tag element.

10. A method as claimed in claim 7, the method further including programming a program memory with a plurality of processing modules, each processing module defining one or more processing operation; and executing one or more processing module in relation to a respective data element, wherein the configuration of one or more tag element identifies a respective location in said program memory corresponding with one or more processing modules to be executed in relation to said respective data element.

11. A method according to claim 7, further including aligning the data signal to provide each data element in parallel; and synchronizing the generation of each tag element with a respective parallel data element.

* * * * *